(12) United States Patent
Clüsserath et al.

(10) Patent No.: US 11,365,106 B2
(45) Date of Patent: Jun. 21, 2022

(54) GAITER SEAL AND WORKING HEAD OF A DEVICE OR MACHINE FOR PRODUCING AND/OR TREATING CONTAINERS, SAID WORKING HEAD COMPRISING SUCH A GAITER SEAL

(71) Applicant: KHS GmbH, Dortmund (DE)

(72) Inventors: Ludwig Clüsserath, Bad Kreuznach (DE); Bernd Bruch, Weinsheim (DE); Dieter-Rudolf Krulitsch, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/580,114

(22) PCT Filed: Jun. 14, 2016

(86) PCT No.: PCT/EP2016/063653
§ 371 (c)(1),
(2) Date: Dec. 6, 2017

(87) PCT Pub. No.: WO2016/207031
PCT Pub. Date: Dec. 29, 2016

(65) Prior Publication Data
US 2018/0134537 A1    May 17, 2018

(30) Foreign Application Priority Data
Jun. 23, 2015   (DE) .................... 10 2015 110 073.8

(51) Int. Cl.
*B67C 3/26*    (2006.01)
*F16J 3/04*    (2006.01)
(Continued)

(52) U.S. Cl.
CPC ............ *B67C 3/2614* (2013.01); *B29C 49/58* (2013.01); *F16J 3/048* (2013.01); *F16K 41/10* (2013.01);
(Continued)

(58) Field of Classification Search
CPC ........ F16J 3/00; F16J 3/04; F16J 3/041; F16J 3/042; F16J 3/06; F16J 3/048; B67C 3/2614; F16K 41/10
See application file for complete search history.

(56) References Cited

U.S. PATENT DOCUMENTS 2,447,570 A * 8/1948  Eisler ...................... F16J 3/047
                                                            141/368
2,701,676 A    2/1955  Day
(Continued)

FOREIGN PATENT DOCUMENTS

DE         38 73 650       12/1992
DE         689 03 046      4/1993
(Continued)

*Primary Examiner* — Timothy L Maust
(74) *Attorney, Agent, or Firm* — Occhiuti & Rohlicek LLP

(57) ABSTRACT

A gaiter seal for shielding a functional element of a container-processing machine extends between parts of a working head of the container-processing machine includes axially-adjacent gaiter modules that extend along an axis and support-and-sliding elements at interfaces between adjacent gaiter modules. The support-and-sliding elements radially support and guide the first and second gaiter-modules along the functional element.

18 Claims, 17 Drawing Sheets

(51) Int. Cl.
    *B67C 3/22*         (2006.01)
    *B29C 49/58*      (2006.01)
    *F16K 41/10*      (2006.01)
    *B29C 49/46*      (2006.01)
    *B29C 49/42*      (2006.01)

(52) U.S. Cl.
    CPC ...... *B29C 49/46* (2013.01); *B29C 2049/4294* (2013.01); *B29C 2049/5803* (2013.01); *B29C 2049/5831* (2013.01); *B67C 2003/228* (2013.01); *B67C 2003/2602* (2013.01); *B67C 2003/2685* (2013.01)

(56) References Cited

U.S. PATENT DOCUMENTS

| | | | | |
|---|---|---|---|---|
| 2,716,517 A * | 8/1955 | Tollberg | B67C 3/16 | 141/117 |
| 3,372,996 A * | 3/1968 | Barrett | B01J 7/02 | 422/129 |
| 3,689,047 A * | 9/1972 | Grosko | B22D 18/06 | 266/208 |
| 3,799,219 A * | 3/1974 | Uth | B67C 3/12 | 137/386 |
| 3,845,791 A * | 11/1974 | Friendship | B67C 3/001 | 137/170.1 |
| 3,871,425 A * | 3/1975 | Fee | B67C 3/26 | 141/117 |
| 3,963,041 A * | 6/1976 | McGillis | F16K 21/18 | 137/410 |
| 4,114,460 A * | 9/1978 | Oto | B62K 25/06 | 188/322.12 |
| 4,402,461 A * | 9/1983 | Mosse | B65B 39/02 | 222/381 |
| 4,444,222 A * | 4/1984 | Yamagiwa | C07C 7/13 | 137/393 |
| 4,793,387 A * | 12/1988 | LeBlanc | B65D 90/105 | 137/312 |
| 4,817,688 A * | 4/1989 | Corniea | B65B 39/02 | 141/140 |
| 4,840,205 A * | 6/1989 | Drevfors | B65B 3/30 | 141/114 |
| 4,856,795 A * | 8/1989 | DeLano | B29C 43/18 | 277/635 |
| 4,903,740 A * | 2/1990 | Corniea | B65B 39/02 | 141/1 |
| 5,025,991 A * | 6/1991 | Stainbrook | B65B 3/22 | 239/459 |
| 5,111,857 A * | 5/1992 | LaWarre, Sr. | B67C 3/22 | 141/144 |
| 6,253,811 B1 * | 7/2001 | Slagh | B65B 39/004 | 141/291 |
| 6,464,268 B1 * | 10/2002 | Hough | F16L 23/08 | 285/367 |
| 10,358,332 B2 * | 7/2019 | Clusserath | B67C 3/286 | |
| 2016/0145088 A1 * | 5/2016 | Krulitsch | B67C 3/262 | 141/39 |

FOREIGN PATENT DOCUMENTS

| | | |
|---|---|---|
| DE | 68903046 T2 | 4/1993 |
| DE | 10 2009 048 780 | 4/2011 |
| DE | 10 2011 018479 | 10/2012 |
| DE | 10 2012 211 926 | 1/2014 |
| EP | 0355290 A1 | 2/1990 |

* cited by examiner

GAITER SEAL AND WORKING HEAD OF A DEVICE OR MACHINE FOR PRODUCING AND/OR TREATING CONTAINERS, SAID WORKING HEAD COMPRISING SUCH A GAITER SEAL

RELATED APPLICATIONS

This application is the national stage of international application PCT/EP2016/063653, filed on Jun. 14, 2016, which claims the benefit of the Jun. 23, 2015 priority date of German application DE 10-2015-110-073.8, the contents of which are herein incorporated by reference.

FIELD OF INVENTION

The invention relates to filling elements, and in, to filling elements that use a gaiter or gaiter seal.

BACKGROUND

In known filling systems, either a tube or a probe sets the filling level in a container. This tube or probe moves up and down to do so. This means that a portion of the tube that is outside the filling element will at some point enter the sterile space inside the filling element. In doing so, bacteria may become entrained and thus contaminate the filling element.

Gaiter seals can be used to form a sterile space around a projecting end of the tube. These gaiter seals have a variable length that can be adjusted as the tube moves axially up and down. However, gaiters that are too long are prone to buckling, particularly as pressure changes occur.

SUMMARY

The invention features the use of a gaiter seal that is less prone to buckling.

In one aspect, the gaiter seal comprises at least two individual gaiter modules lying axially adjacent to one another and tightly connected to one another along the gaiter axis so as to form the respective gaiter seal, and provided for example in a standard size. Since each individual gaiter module inherently possesses sufficient stability, by making an appropriate choice of the number of these individual gaiter modules the length of the gaiter seal can be matched to the requirements without compromising the stability of the gaiter seal overall.

Between the ends of the gaiter seal is at least one sliding-and-supporting element that, if provided in the interior of the gaiter, is radially supported off the rod-shaped and/or tubular functional element surrounded by the gaiter seal or is supported outside the gaiter seal by a guide. The sliding-and-supporting element is preferably arranged at the interface between the axially adjacent individual gaiter modules. As to their axial length, inside diameter, size of the extendible length variation, wall thickness, choice of material etc., the individual gaiter modules supported by the at least one sliding-and-supporting element can be readily manufactured in such a way that they withstand the loads that occur during the particular application. It is then also possible to produce the gaiter seal in any required length by using an appropriate number of individual gaiter modules. A gaiter seal thus constructed will have the stability needed for the loads that occur during the particular application.

In some embodiments, the sliding-and-supporting element, especially the sliding-and-supporting element that is provided inside the gaiter seal, is part of an individual gaiter module. In other embodiments, it is an independent component that is designed, for example, in the shape of a disc or plate and placed and/or accommodated in one of the gaiter seal's individual gaiter modules.

In addition to having a first opening for the passage of the rod-shaped and/or tubular functional element, the sliding-and-supporting element inside the gaiter seal also has at least one passage connecting the individual gaiter modules to allow the flow of fluid therethrough. Such a fluid can be gas or liquid. A particularly useful fluid is a cleaning or sterilizing agent for treating the inner surfaces of the gaiter seal and the outer surface of the rod-shaped and/or tubular functional element.

In some embodiments, this passage, which is preferably formed by at least one second opening, is inclined by relative to the longitudinal axis of the gaiter seal or of the functional element. This promotes a swirling motion in the medium inside the gaiter seal. When the medium is a cleaning medium, this intensifies internal cleaning and/or internal sterilization. A plurality of second openings are provided distributed around the first opening.

The ends or end faces of the individual gaiter modules are preferably designed so that they are connected to other individual gaiter modules directly, e.g., by connecting sections or coupling sections, or indirectly, e.g., by connecting pieces or intermediate pieces. The connection is made preferably by screw-fastening to the end faces of the individual gaiter modules or to connecting sections or coupling sections configured on the end faces, or by clamping or bracing to these sections. The sliding-and-supporting elements are preferably formed by coupling sections or by connecting pieces or intermediate pieces.

The gaiter seal forms around the rod-shaped and/or tubular functional element a flexible channel (for example a ring channel or annular space) that facilitates an axial adjustment of this functional element, for example of a rod-shaped probe or of a Trinox tube of a filling element, without a sliding seal. A gas exchange is possible between the individual gaiter modules. The gaiter seal also permits the passage of fluid over its entire length to facilitate a complete cleaning and/or disinfection, in particular also for CIP cleaning and/or disinfection of its inner surfaces, and in any length condition.

If the gaiter seal is part of a filling element, then during the filling process it may be expedient for the channel (for example ring channel or annular space) formed between the rod-shaped and/or tubular functional element and the inner surface of the gaiter seal to be completely excluded from the filling process, for example to be applied with a sterile gaseous medium at a reduced operating pressure, e.g. at an operating pressure having a maximum of 3 bar The purging of the flexible channel during cleaning and/or disinfection is then effected for example with the inclusion of process paths or process channels of the working head, for example of the filling element, or of the filling machine, or again using separate connections through which the cleaning medium and/or disinfectant is supplied and/or discharged.

Because the gaiter seal possesses a high degree of stability, especially against buckling, it can also be used to pre-tension or press the respective rod-shaped and/or tubular functional element when in an initial position for example against an upper height-adjustable stop, this being achieved by the inherent elasticity of the gaiter seal and/or by applying an internal pressure to said seal. An externally arranged spring for example can also be arranged here to provide support. If the filling process requires a vacuum inside the gaiter seal, then the seal can also be connected to the adjustable stop.

As used herein, "containers" are in particular cans, bottles, drums, also kegs, tubes, pouches, made from metal, glass, and/or plastic, and other packages suitable for filling liquid or viscous products.

As used herein, the expression "container present in sealed position against the treatment head or filling element" means that the respective container lies with its container mouth pressed tightly up against the treatment head or filling element or against a seal that is located there, in the manner known to a person skilled in the art.

For the purpose of the invention the expressions "essentially," "in essence" or "around" mean variations from the respective exact value by +/−10%, preferably by +/−5% and/or variations in the form of changes insignificant for the function.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE FIGURES

Further embodiments of the invention are the subject-matter of the dependent claims. The present invention is explained further below in conjunction with the figures and by reference to embodiments. In the figures:

DETAILED DESCRIPTION

Figure 1:
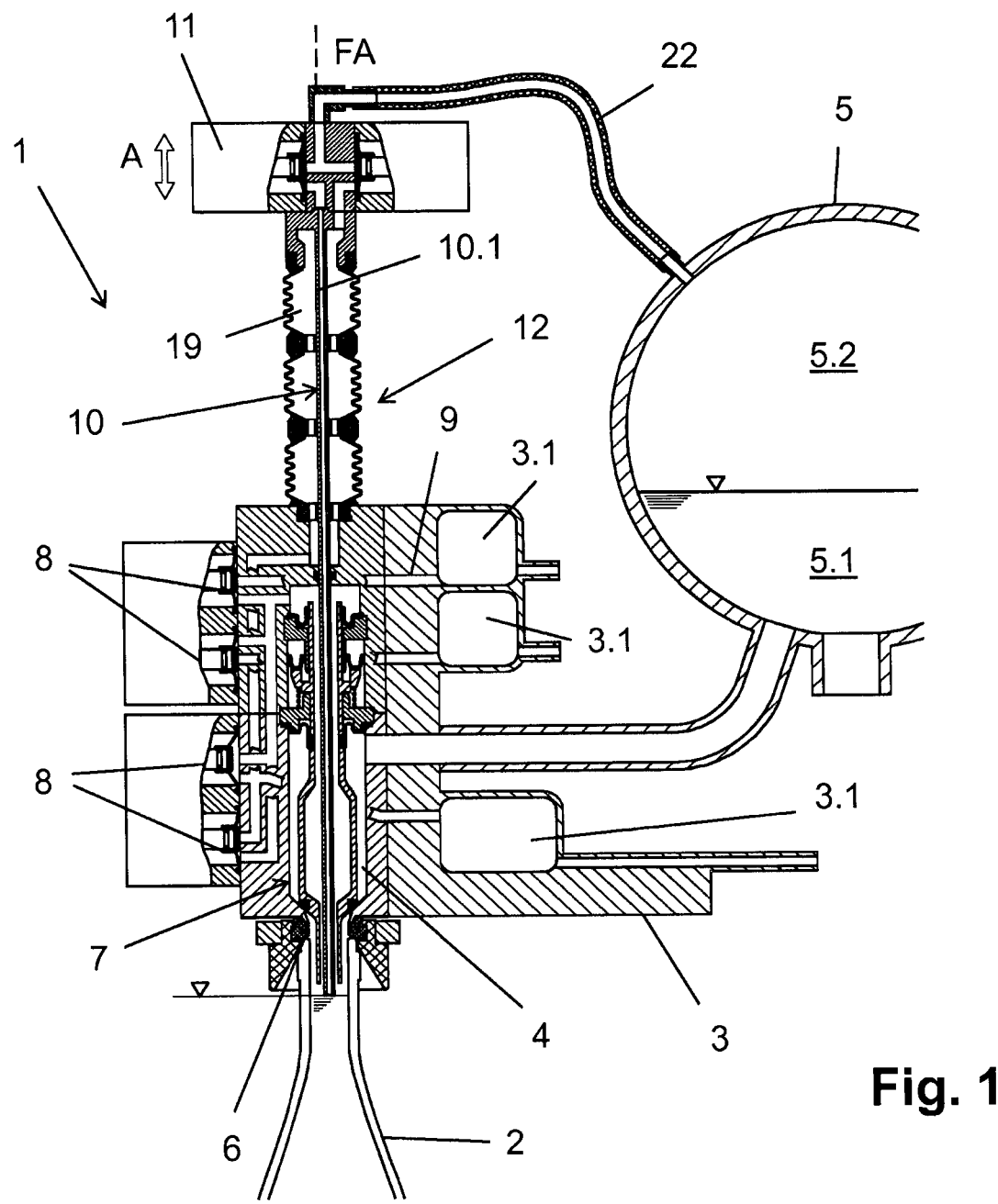
FIG. 1 shows a simplified sectional view of a filling element having a gaiter seal.

FIG. 1 shows a container-processing machine having a working head. In the illustrated embodiment, the container-processing machine is of the type used for filling containers. In such a container-processing machine, the working head is a filling element 1 for filling containers 2, such as bottles, with liquid product. The filling element 1 is one of many identical filling elements on a rotor 3 that is driven to rotate around a vertical machine axis of a filling machine.

The filling element 1 includes a filling-element housing 1.1 that forms a liquid channel 4. When a container 2 is being filled, the liquid channel 4 connects to a liquid space 5.1 within a product tank 5. This product tank 5 connects to all the filling elements on the rotor 3. At the underside of the filling element 1, the liquid channel 4 forms a delivery opening 6 through which it delivers the product into the container 2. A liquid valve 7 controls this delivery.

Control valves 8 control different gas paths 9 within the filling-element housing 1.1. These gas paths 9 connect to ring channels 3.1 on the rotor. The control valves 8 control flow through these gas paths 9 to implement different filling processes.

Each filling element 1 includes a functional element 10 that adjusts axially along a vertical filling-element axis A. In FIG. 1, the functional element 10 is a tube 10 that controls the height of the product level in the container at the end of the filling process, referred to herein as the "fill level."

During the filling procedure, the container's opening is sealed against the filling element 1. The tube 10 then passes through this opening. As liquid enters the container, the level of liquid eventually reaches the bottom of the tube 10 and slightly overfills the container. Pressure applied into the resulting headspace forces liquid out of the tube 10 until the tube 10 is no longer submerged. The product forced out of the container 2 by this pressure returns to the tank 5 through the tube 10 via a tank connector 22. In this way, the extent to which the tube 10 penetrates into the container 2 determines the fill level. The tube 10 is axially adjustable so that this fill level can be adjusted, as shown by the double-headed arrow A.

The lower length of the tube 10, which enters the filling-element housing 1.1, is sealed off. However, an upper length 10.1 of the tube 10 projects by a considerable extent above the top of the filling-element housing 1.1 towards a valve block 11 that carries out the height adjustment of the tube 10. The valve block 11 is therefore that part of the filling element 1 that connects to the tube 10 and that moves with the tube 10.

When the valve block 11 moves the tube 10 downward to adjust the filling level downward, this upper length 10.1 may entrain bacteria as it penetrates into the filling-element housing 1.1.

Figure 2:
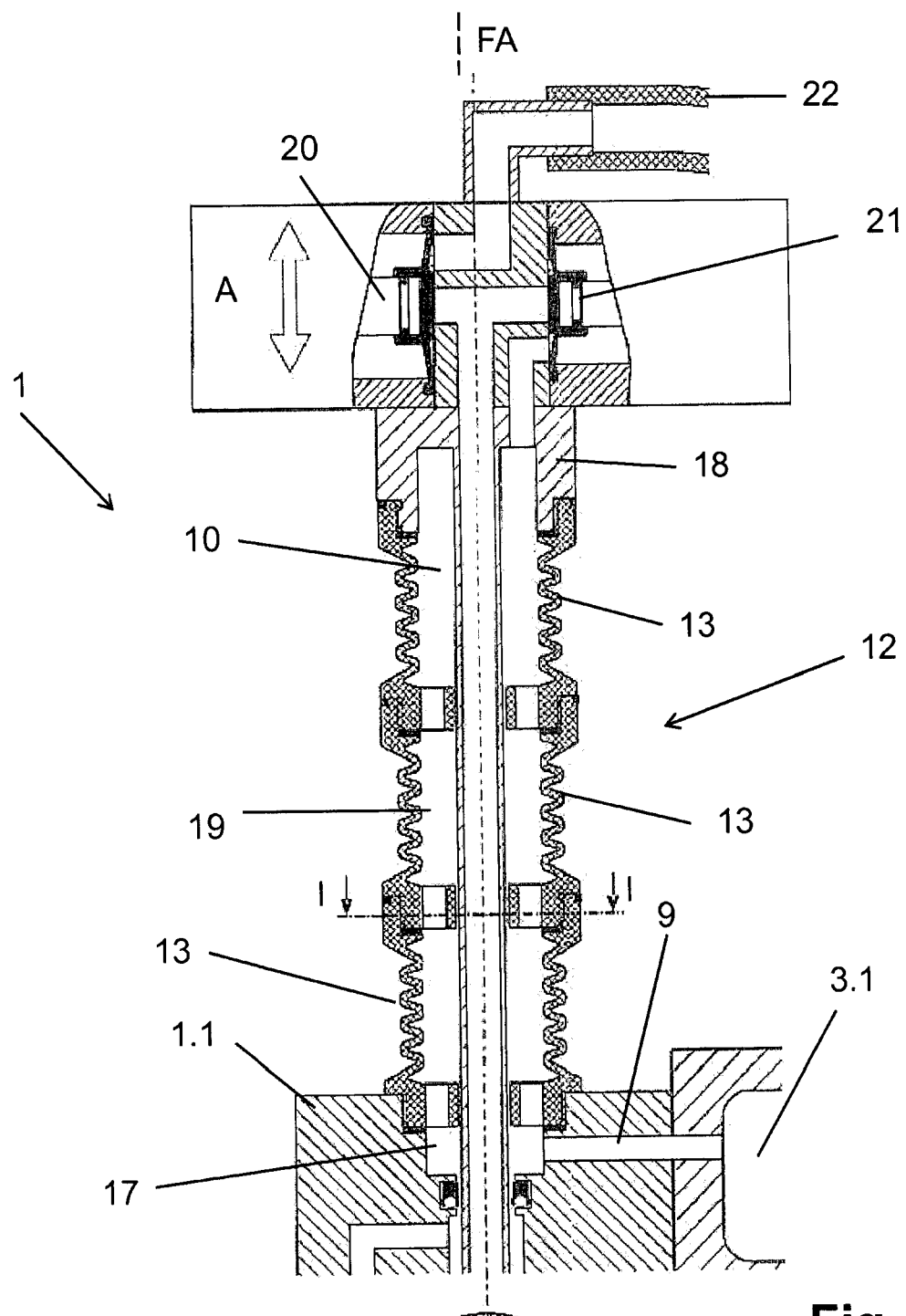
FIG. 2 shows a simplified sectional view of a height-adjustable tube surrounded by a gaiter seal.
Figure 3:
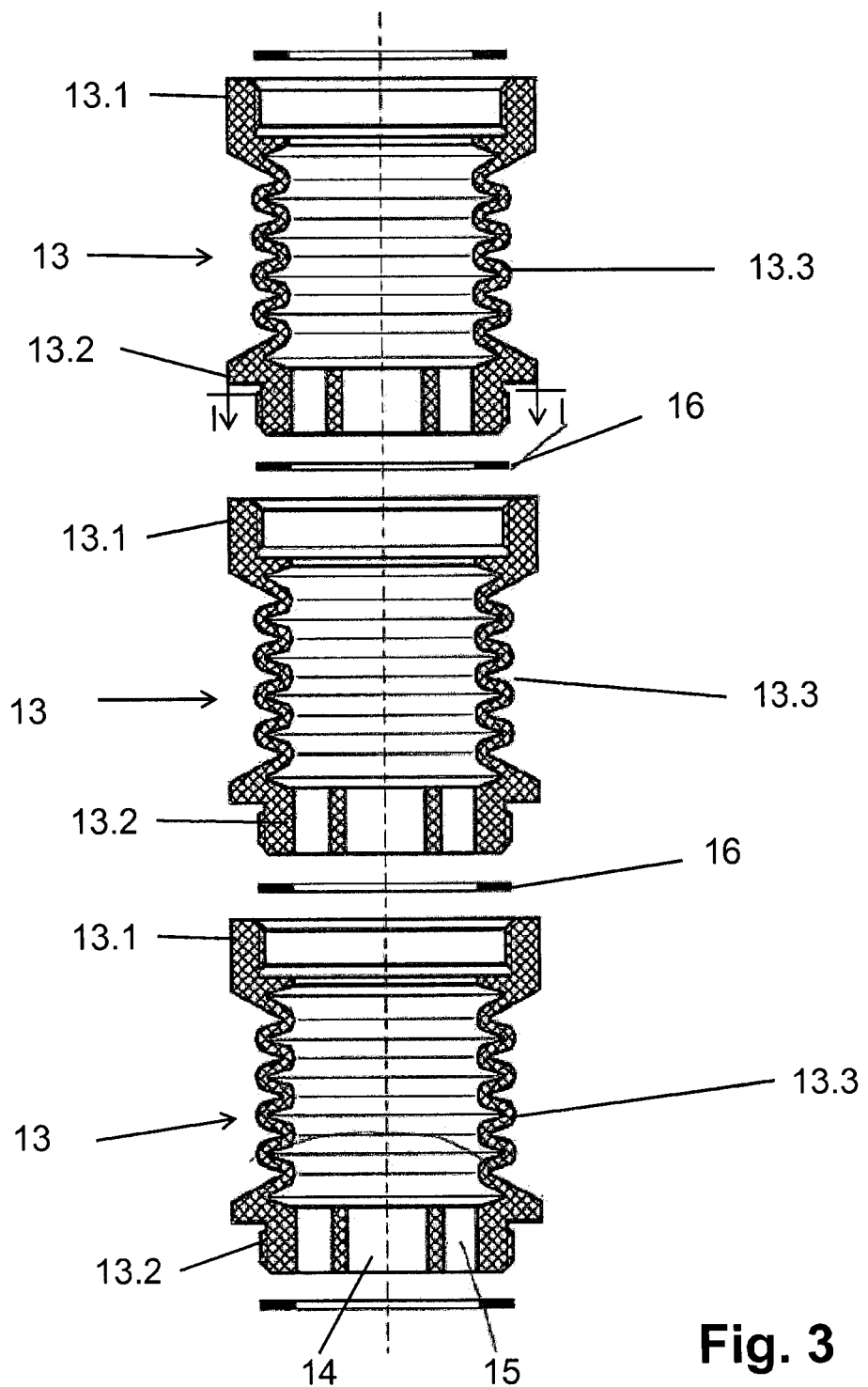
FIG. 3 shows a plurality of individual gaiter modules forming the gaiter seal of FIGS. 1 and 2.
Figure 4:
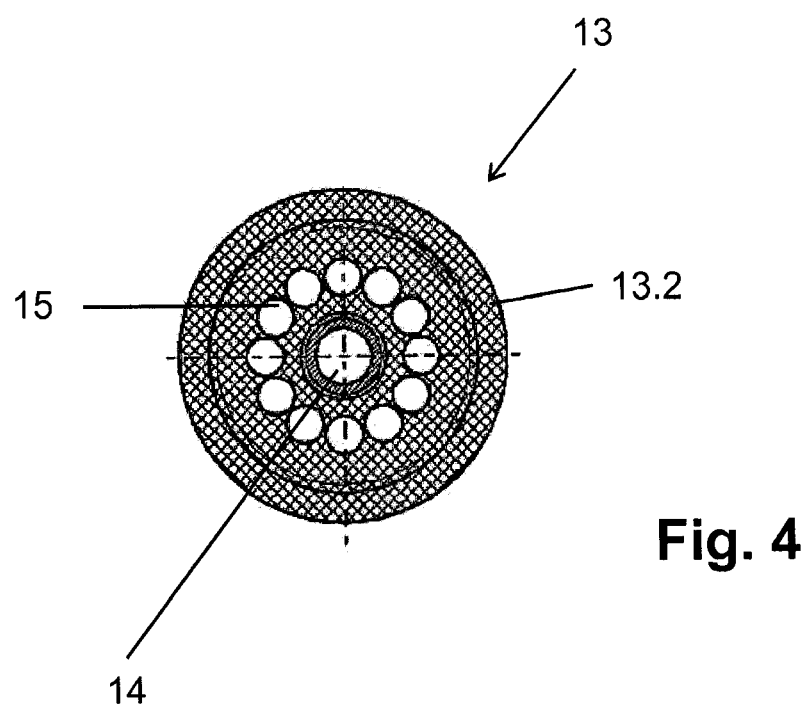
FIG. 4 shows a section on line I-I of FIG. 3.

To suppress the likelihood of such entrainment, it is useful to surround the upper length 10.1 with a gaiter seal 12. In the illustrated embodiment, the gaiter seal 12 is configured as a gaiter that extends in a direction parallel to the filling-element axis FA. As shown in FIGS. 2 and 3, the gaiter seal 12 includes plural gaiter modules 13 that lie axially adjacent to each other along the filling-element axis FA. These gaiter modules 13, of which three are present in the illustrated gaiter seal 12, are tightly interconnected to each other with a sealing ring 16 between them. The number of such gaiter modules 13 depends on the total length of the gaiter seal 13.

In the illustrated embodiment, the gaiter modules 13 are identical modules that have been molded from a suitable material, such as plastic. Referring to FIG. 3, the gaiter module 13 has annular upper and lower coupling-sections 13.1, 13.2. The upper coupling-section 13.1 has a female thread and the lower coupling-section 13.2, which is disk-shaped, has a male thread that fits the female thread of the upper coupling-section 13.1. Between the upper and lower coupling-sections 13.1, 13.2 is a gaiter section 13.3 whose length varies. Varying the length of the gaiter sections 13.3 varies the length of the gaiter seal 12 as a whole.

The lower coupling-section 13.2 features a central opening 14 that engages the tube 10. Accordingly, the lower coupling-section 13.2, and hence the gaiter 13, is supported by and guided along the tube 10. The lower coupling-section 13.2 thus forms a sliding-and-supporting element for the gaiter seal 12.

The lower coupling-section 13.2 also features a plurality of peripheral openings 15 disposed around the central opening 14. These peripheral openings 15 form passages that are used for cleaning and purging an annular space 19, best seen in FIG. 2. The annular space 19 separates the outer surface of the tube 10 and the inner surface of the gaiter seal 12.

Assembly of the gaiter seal 12 proceeds by connecting the gaiter modules 13 to each other. This includes placing a sealing ring 16 between a lower coupling-section 13.2 of one gaiter module 13 and an upper coupling section 13.1 of another gaiter module 13 and then screwing them together. The lower end of the gaiter seal 12 is likewise screwed to the filling-element housing 1.1. A sealing ring 16 seals the joint thus formed. In the illustrated embodiment, this is carried out by screwing lower coupling-section 13.2 into the female thread of an opening 17 of a gas channel of the gas paths 9. The upper end of gaiter seal 12 is attached to a connector 18 on the valve block 11 with the use of a sealing ring 16 by screw-fastening the upper coupling-section 13.1.

Because the gaiter seal 12 is made of gaiter modules 13, it can easily be made to have different axial lengths. This permits the gaiter seal 12 to adapt to tubes 10 having upper lengths 10.1 of different extents and to tubes 10 having different extents of height-adjustment.

In addition, the use of gaiter modules 13 suppresses the natural tendency of the gaiter seal 12 to buckle or deviate laterally. This suppression arises because of radial support and guiding of individual gaiter modules 13 with their respective lower coupling-sections 13.2 on the tube 10. Since the number of gaiter modules 13 increases with as the gaiter seal 12 becomes longer, this remains effective even if the gaiter seal 12 is of considerable length.

During the filling operation, an inert and sterile gas fills the annular space 19 to a pressure that is either at or slightly above normal ambient pressure.

In some embodiments, the filling element 1 is configured so that during cleaning and disinfection of the filling machine or the filling elements 1, for example, during CIP cleaning, a liquid cleaning medium and disinfectant used for this purpose flows through the annular space 19.

To permit such flow, the valve block 11 includes first and second valves 20, 21. During normal filling, the second valve 21 remains closed and the first valve 20 remains open to permit gas or product to be discharged through the tube 10 to be returned to the tank 5. This occurs during the final setting of the fill level in the container 2 when the tube 10 is being used as a trinox tube.

During cleaning or disinfection of the filling element 1, and in particular, of the annular space 19, the first and second valves 20, 21 remain open. This permits cleaning medium to enter the annular space through one of the gas paths 9 and to flow through the first and second valves 20, 21 and back to the gas space 5.2 of the tank 5 via the tank connector 22.

In order to achieve optimal cleaning and/or disinfection on all surfaces adjoining the annular space 19, and in particular on the folds of gaiter seal 12, the peripheral openings 15, through which the cleaning medium and/or disinfectant flows, are preferably configured at an angle so as to promote swirling motion of the liquid cleaning medium and/or disinfectant. This swirling motion intensifies the cleaning and/or disinfection carried out by the cleaning medium as it flows through annular space 19.

A gaiter seal 12 can be vulnerable to high internal pressures. For example, when bottling sparkling wine, internal pressures can easily reach 7 bar. A conventional gaiter seal would have to be complex and expensive to sustain itself through such conditions.

The apparatus described herein avoids using the annular space 19 during the normal filling operation. This avoids both exposure to high pressure and gas losses. The gaiter seal 12 only has to sustain high pressure during the cleaning process. This pressure is typically no more than 3 bar applied to the annular space 19.

The cleaning process begins with moving the valve block 11 to its lowest position, thereby minimizing the length of the gaiter seal 12. This occurs before any cleaning medium is introduced into the annular space 19.

Starting with the gaiter seal 12 in its shortest state, cleaning fluid is introduced into the annular space 19. The valve block 11 then extends the gaiter seal 12 as cleaning medium enters the growing annular space 19. This procedure suppresses formation of gas bubbles form inside the annular space 19 and also ensures coverage of all the folds of the gaiter seal 12 with cleaning medium.

The gaiter seal 12, the individual gaiter modules 13, the upper and lower coupling sections 13.1, 13.2, and the gaiter section 13.3 all have cross-sections that are considerably larger than that of the tube 10. This permits the annular space 19 to have a large cross-section. This large cross-section of the annular space 19 permits cleaning medium to flow through the annular space 19 with essentially no loss of pressure. It also promotes creation of a swirling motion that intensifies cleaning of the inner surfaces of the annular space 19.

The upper and lower coupling-sections 13.1, 13.2 are far less elastic than the gaiter section 13.3 that lies between them. Compared to the gaiter section 13.3, the upper and lower coupling-sections 13.1, 13.2 are essentially rigid. With the gaiter modules 13 being configured as single pieces, such rigidity can be achieved by having the walls of the upper and lower coupling sections 13.1, 13.2 be thicker than those of the gaiter section 13.3

Figure 5:
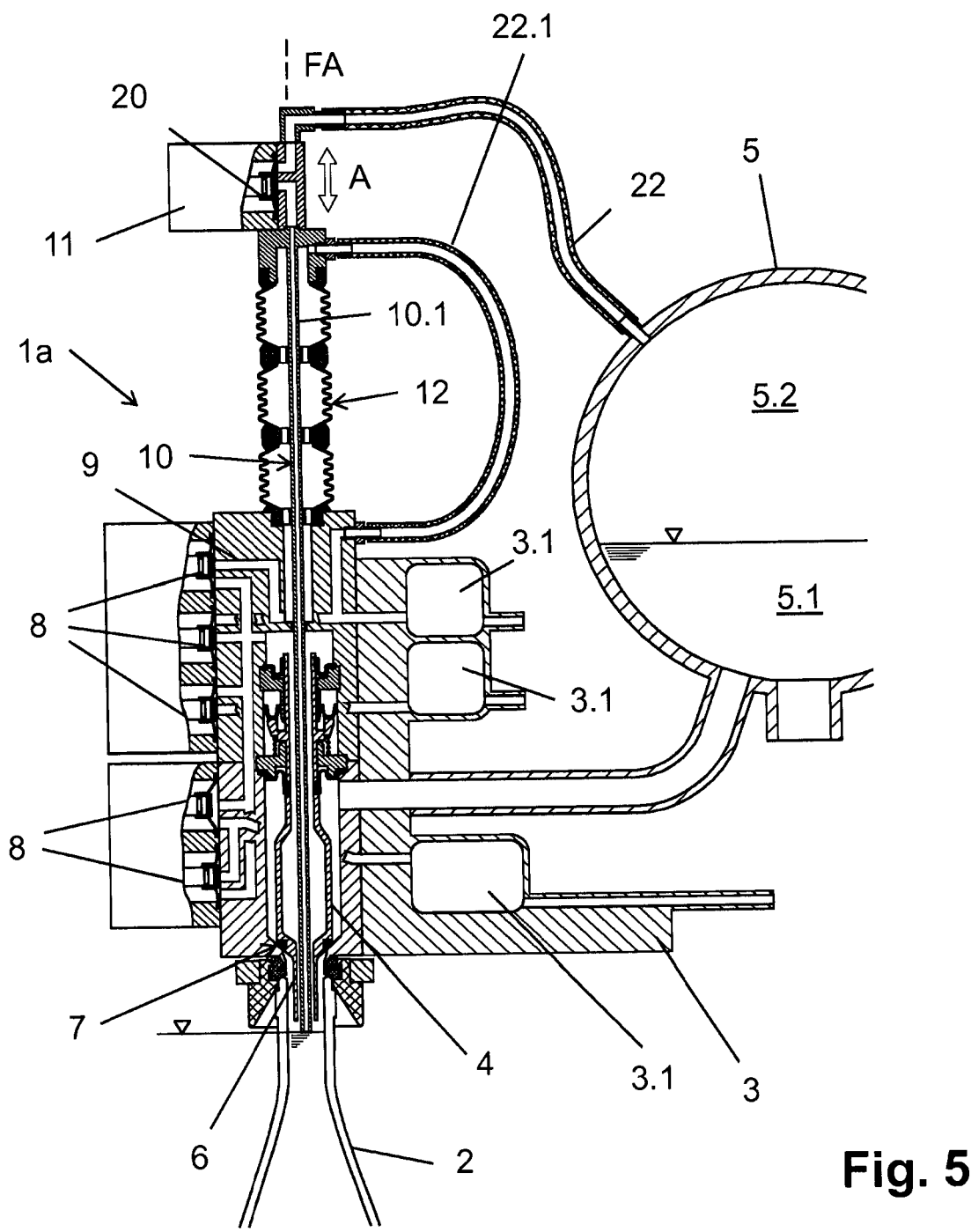
FIGS. 5-8 each show a simplified sectional view of further filling elements having a gaiter seal

In a first alternative filling element 1*a* shown in FIG. 5, only the first valve 10 is in the valve block 11. A connection 22.1 permanently connects the upper end of the annular space 19 and a gas path 9 to a ring channel 3.1 on the rotor 3. The ring channel 3.1 typically carries a sterile inert gas at ambient pressure or at a positive pressure. A typical gas is sterile carbon dioxide. Cleaning medium for cleaning the annular space comes from the process paths of the first alternative filling element 1*a* and leaves the annular space 19 through the connection 22.1.

Figure 6:
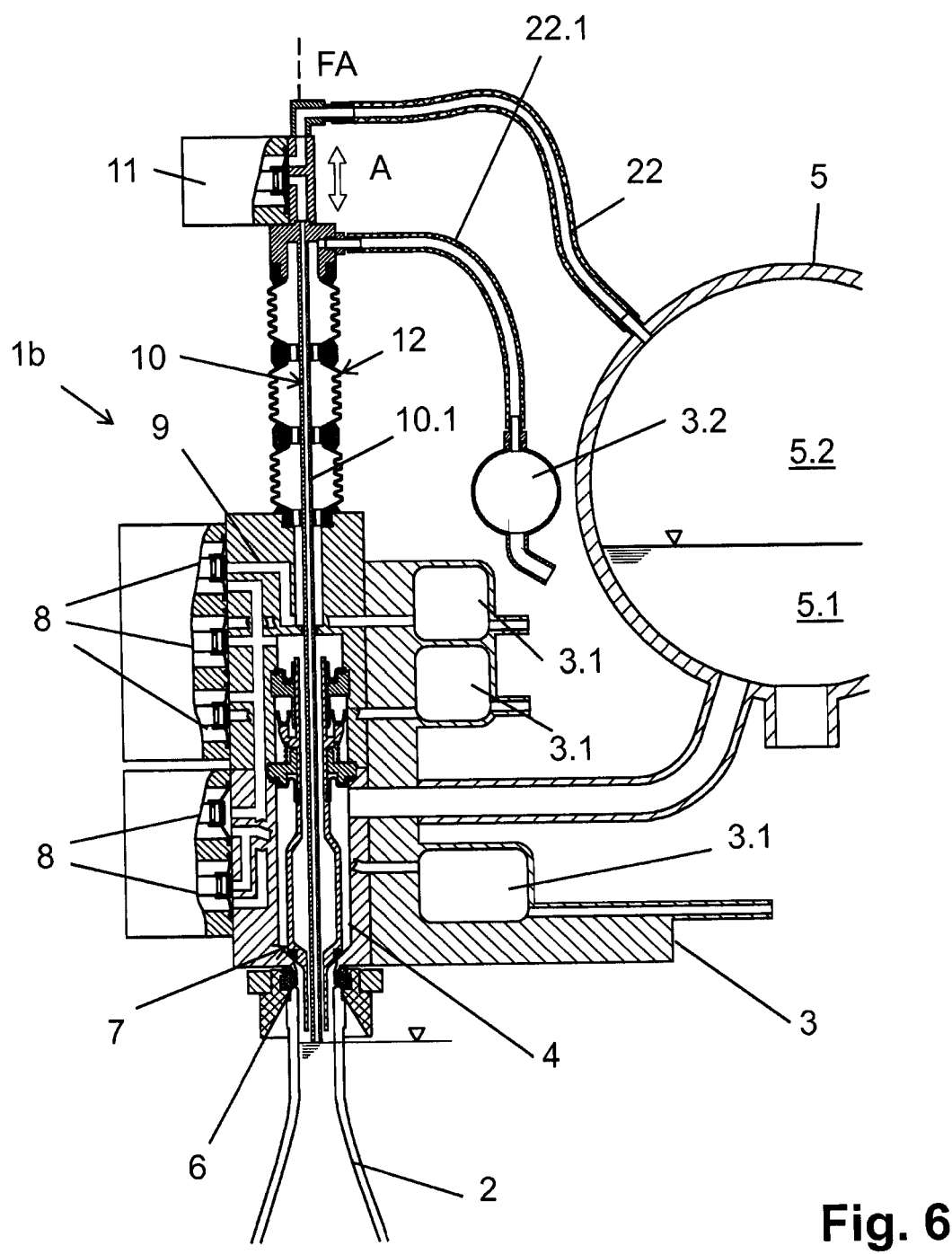

A second alternative filling element 1*b*, shown in FIG. 6, has the upper end of its annular space 19 permanently connected to an additional ring channel 3.1 on the rotor 3. This additional ring channel 3.2 is shared by all the second alternative filling elements 1*b*.

Figure 7:
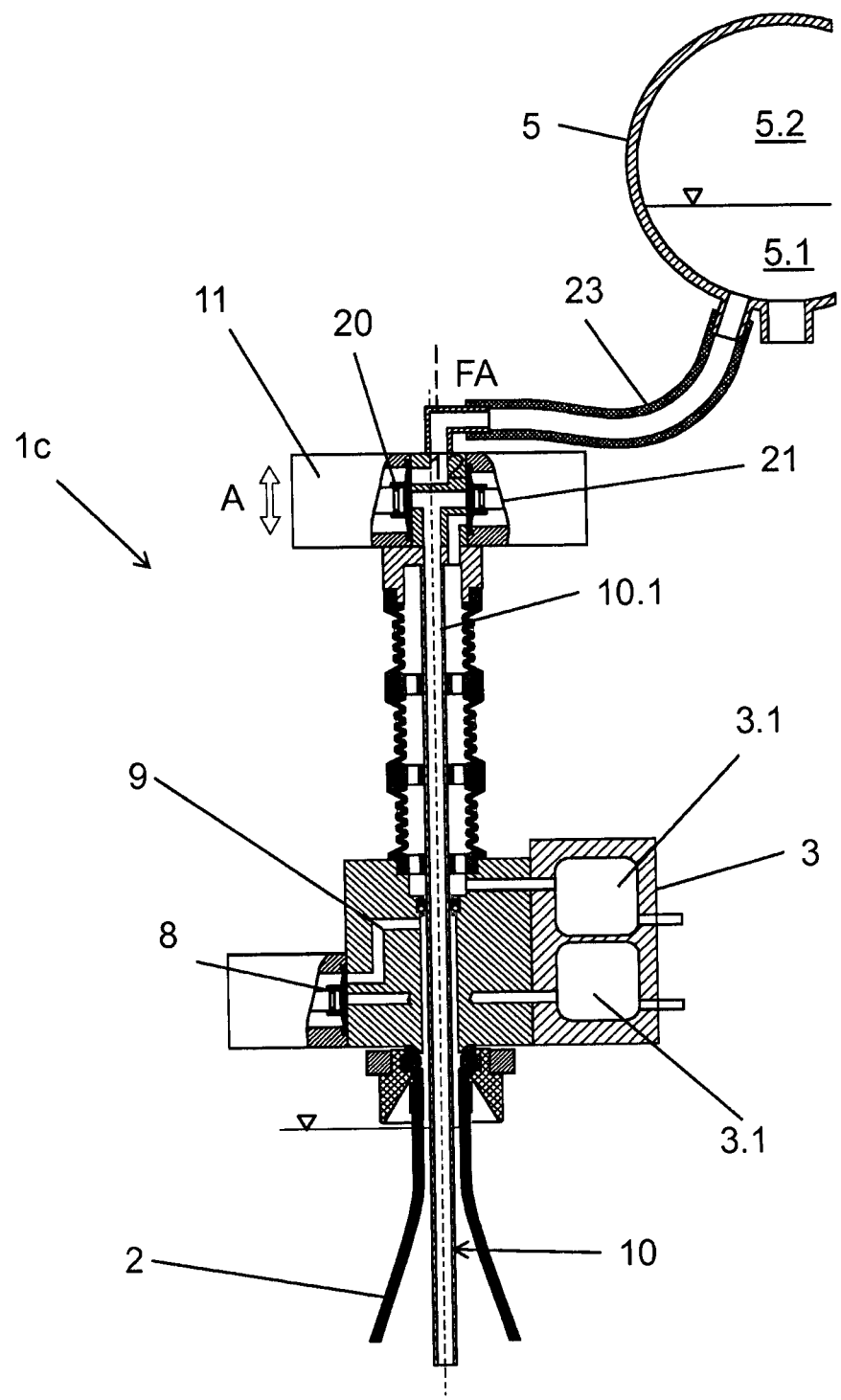

FIG. 7 shows a third alternative filling element 1*c* in which the tube 10 is also a filling tube that can be connected to the liquid space 5.1 of the tank 5. The first valve 20 provides control over the flow through the tube 10.

In this embodiment, the annular space 10 is permanently connected to a ring channel 3.1 on the rotor 3. During the filling process, the ring channel 3.1 is at ambient pressure or at low positive pressure, for example at a pressure that is no more than 3 bar. A sterile inert gas fills the ring channel 3.1 under these circumstances.

During filling, the second valve 21 remains closed, thus isolating the annular space 19 from any process paths, and in particular, from a product line 23 that leads to the tank 5.

During cleaning, cleaning medium delivered from the tank 5 is discharged through the ring channel 3.1 or vice versa. In either case, it flows through the annular space 19 with the first and second valves 20, 21 open.

Figure 8:
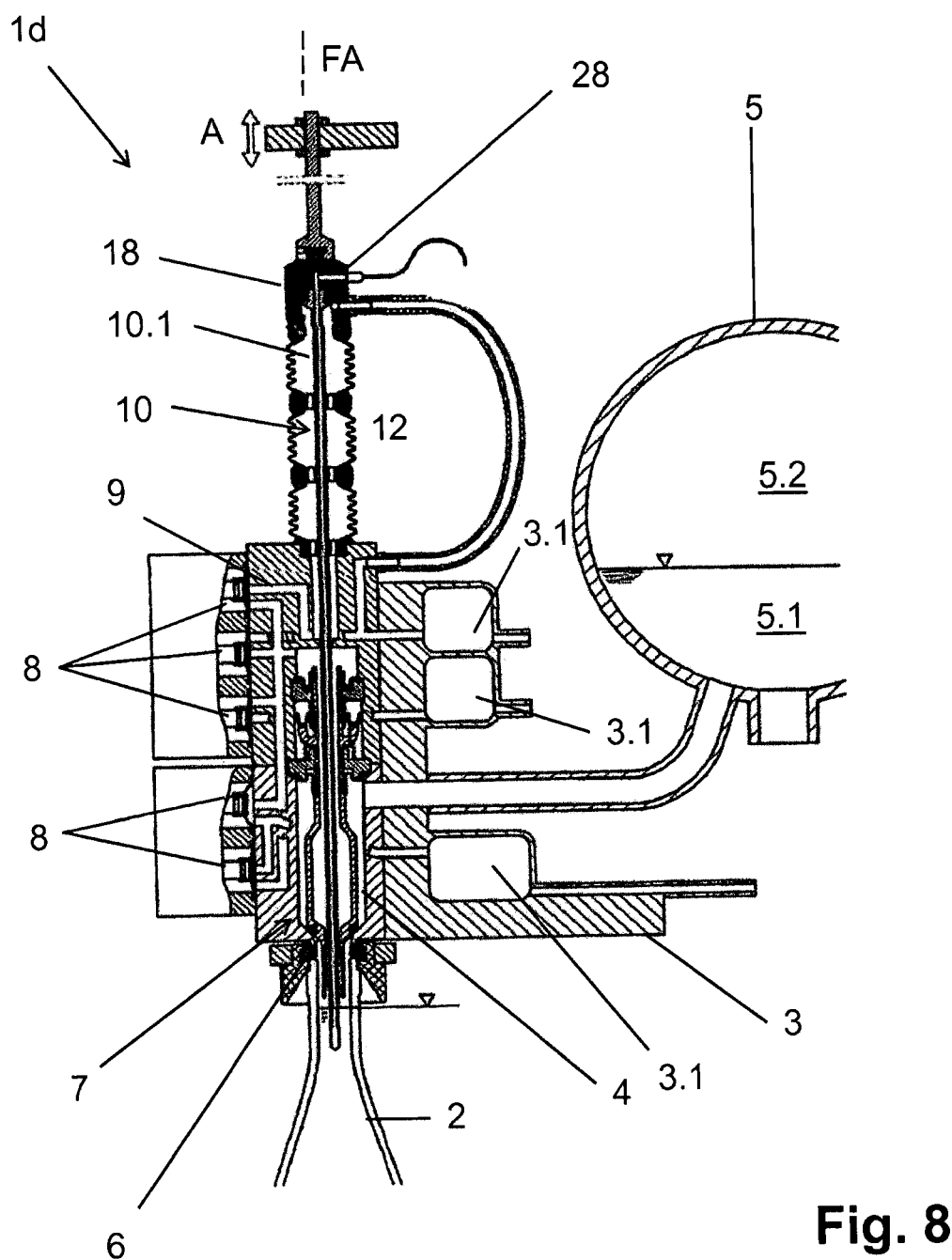

FIG. 8 shows a fourth alternative filling element 1*d* in which the functional element 10 is an electrical probe 10 that determines fill level. The probe 10 is axially adjustable as indicated by the double-arrow A. An upper portion of the probe 10 extends out of the filling-element housing 1.1. A gaiter seal 12 surrounds this upper portion.

A contact 28 provides electrical communication between the probe 10 and control electronics. The contact 28 can be placed within the gaiter seal 12 or inside the connector 18, both of which are made of an electrically non-conductive material.

Figure 9:
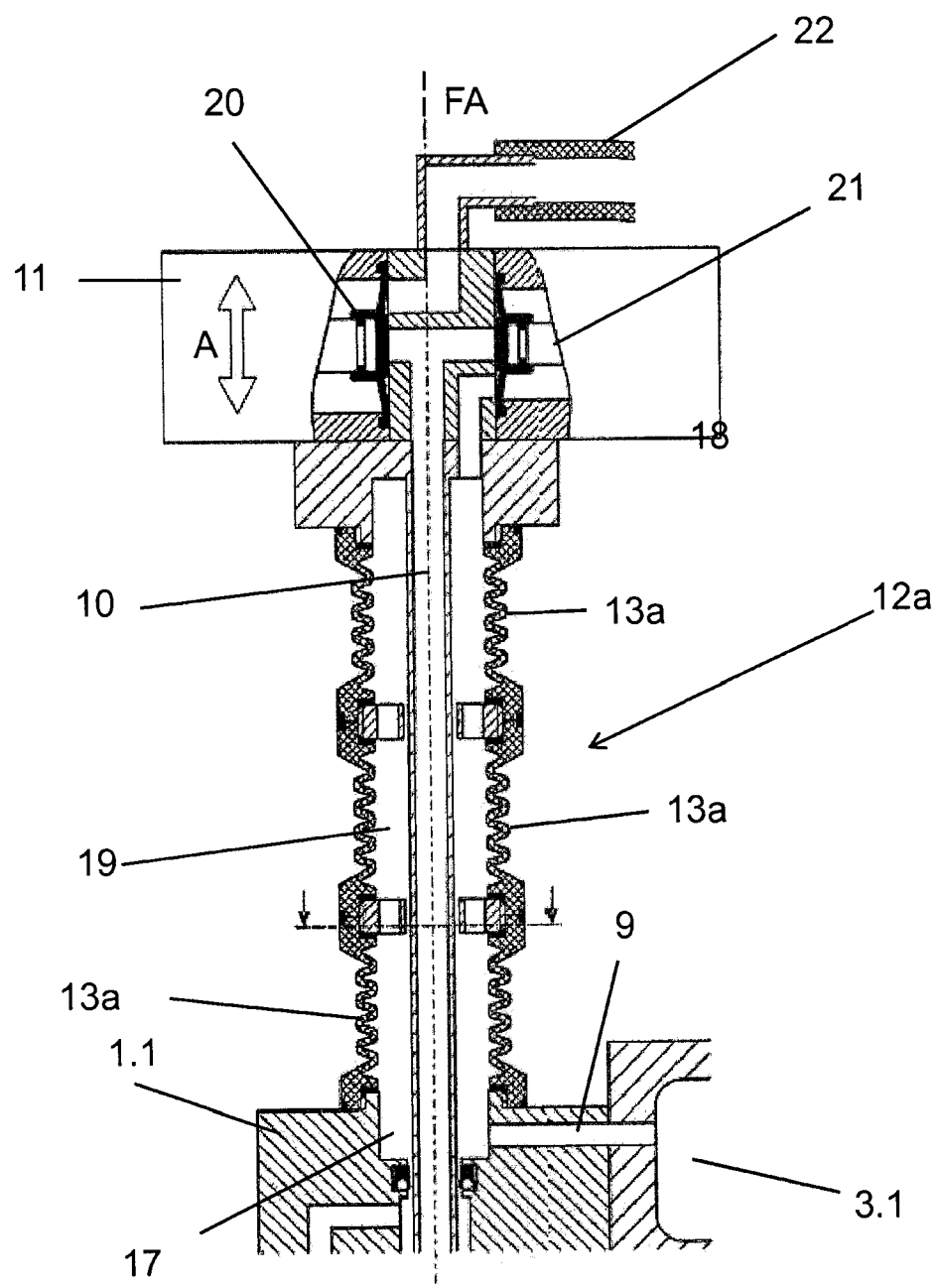
FIGS. 9-11 show views similar to FIGS. 2-4 of a further embodiment of the gaiter seal.
Figure 10:
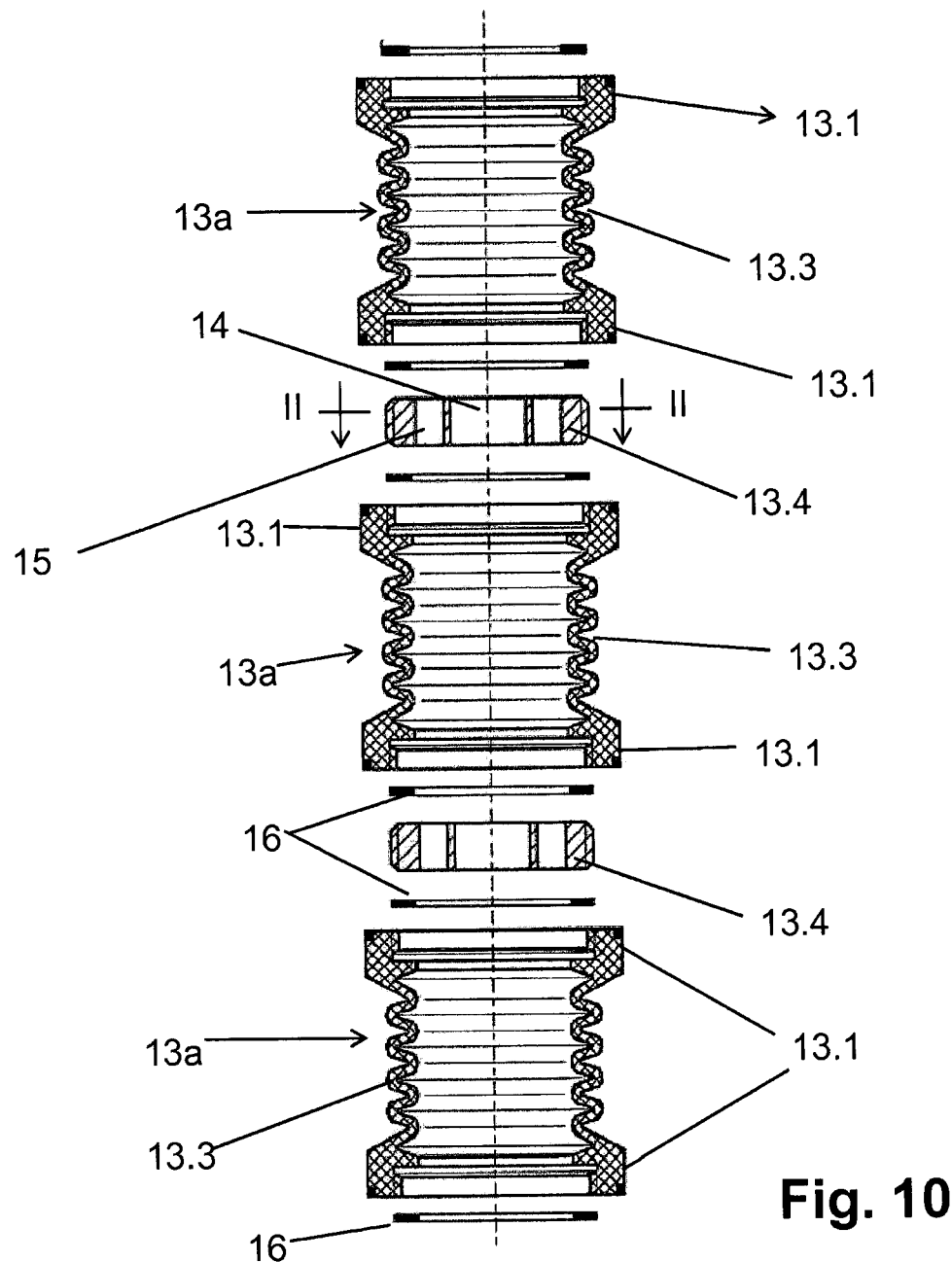
Figure 11:
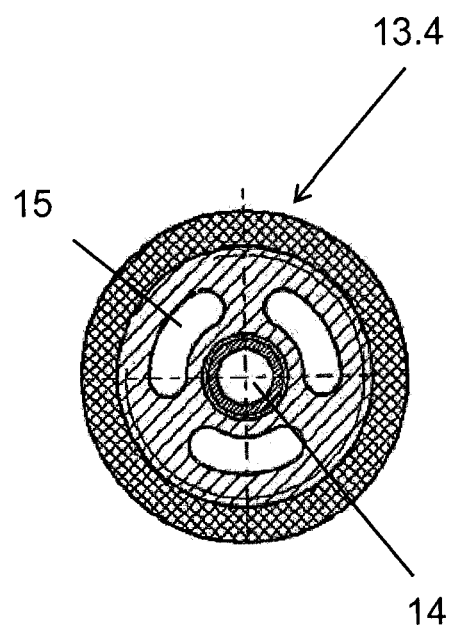

FIGS. 9-11 show a first alternative gaiter seal 12a in which intermediate pieces 13.4 are used between gaiter modules 13. Each end of a gaiter module 13 has an annular coupling section 13.1 having a female thread. The intermediate pieces 13.4 have male threads on both sides thereof and can thus be used to join two gaiter modules 13 with female threads.

Each intermediate piece 13.4 includes a central opening 14 and peripheral openings 15, as shown in FIG. 11. These act as sliding or support elements to connect the first alternative gaiter modules 13a together. The first alternative gaiter modules 13a succeed each other in the axial direction and are screwed to each other by corresponding intermediate pieces 13.4. The upper end of the first alternative gaiter seal 12a connects to a connector 18 of the valve block 11 by screwing on the topmost upper coupling section 13.1. Similarly, the lower end of first alternative gaiter seal 12a connects to the filling element housing 1.1 by screwing the lowermost lower coupling-section 13.1 onto a male thread of the filling element housing 1.1. Sealing rings 16 ensure tight connections at each of the joints thus formed.

Figure 12:
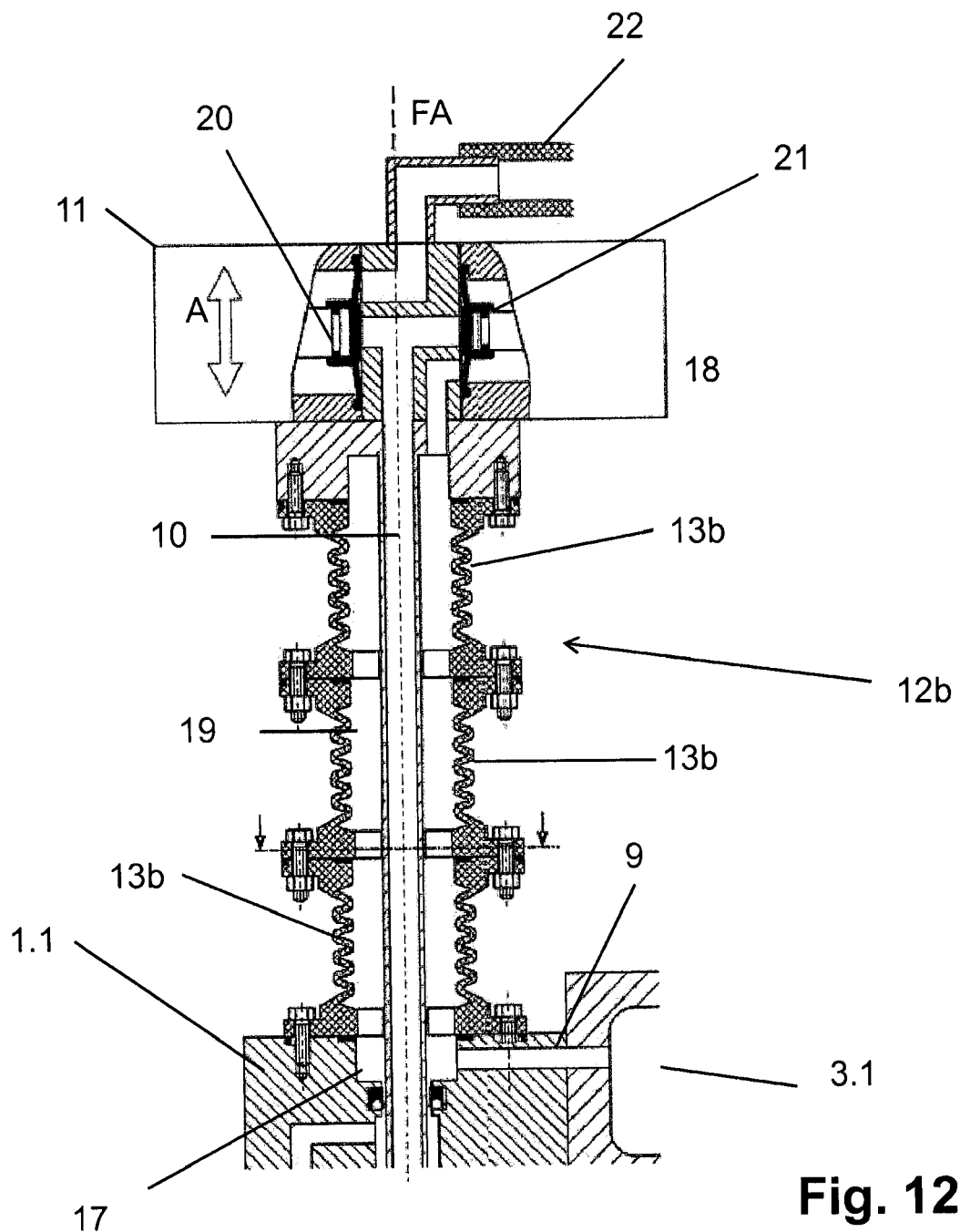
FIGS. 12-14 show views similar to FIGS. 2-4 of a further embodiment of the gaiter seal.
Figure 13:
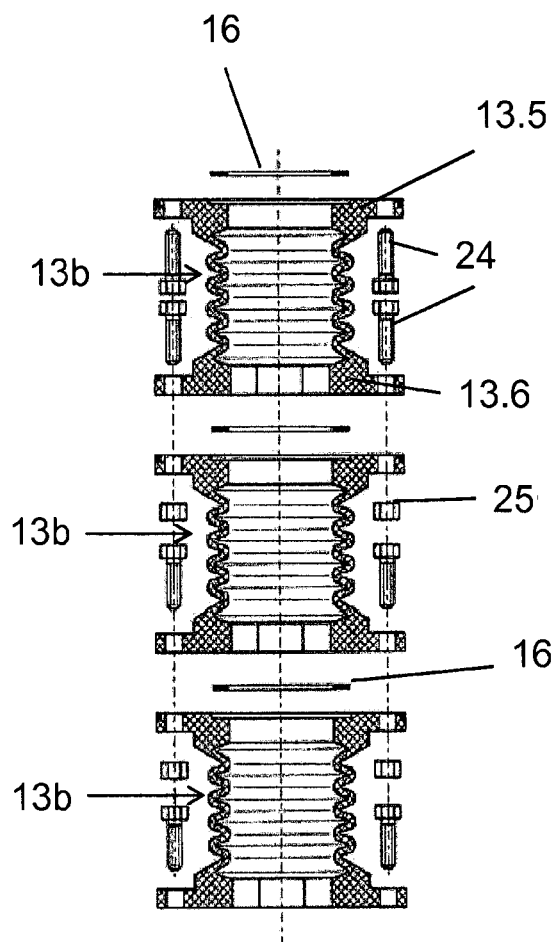
Figure 14:
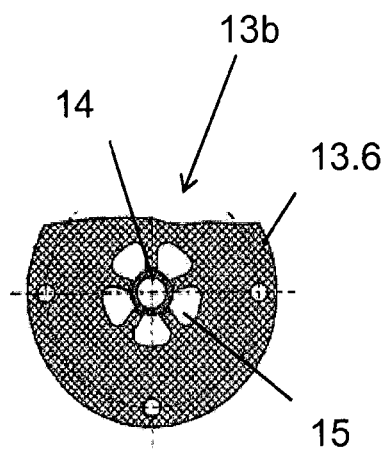
Figure 15:
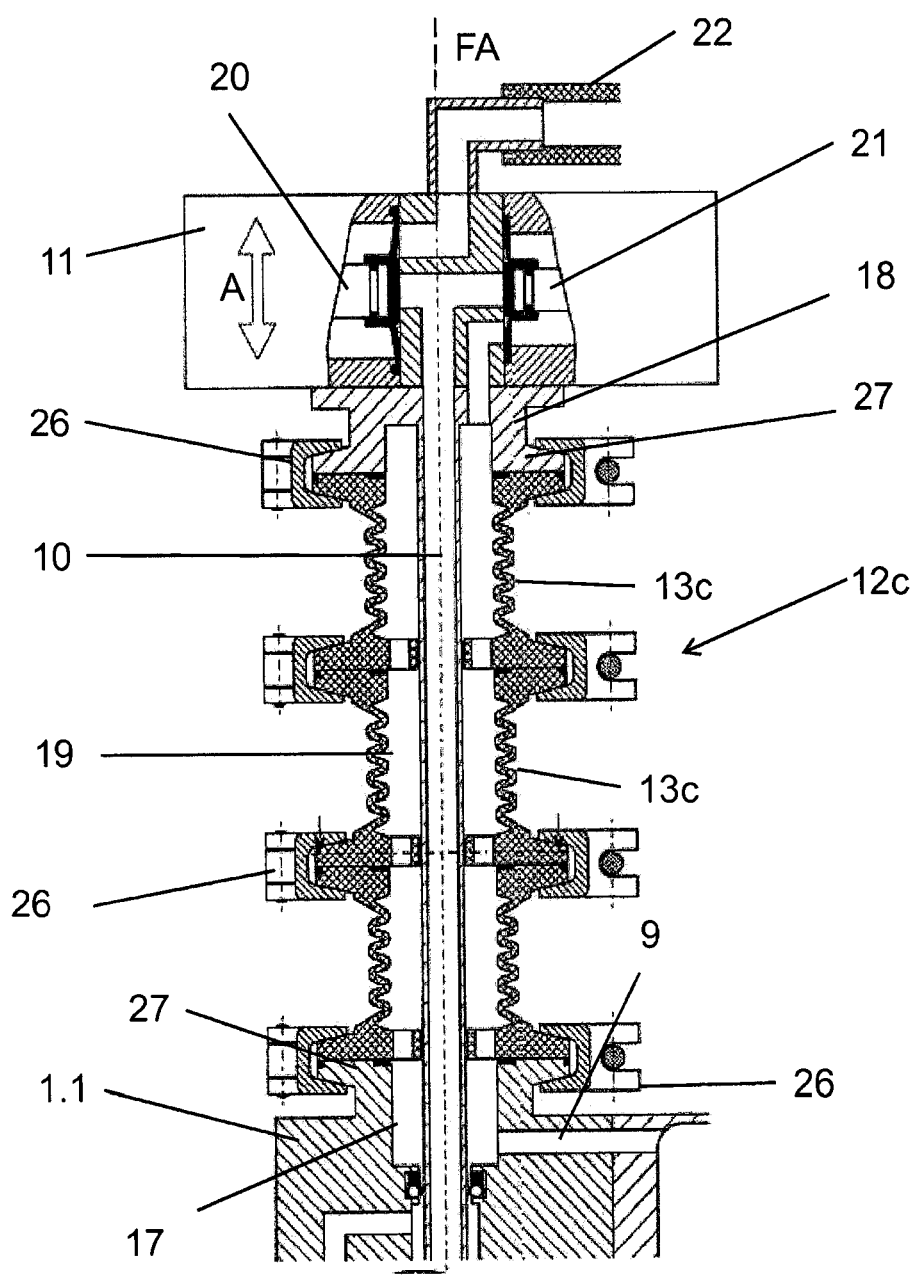
FIGS. 15-17 show views similar to FIGS. 2-4 of a further embodiment of the gaiter seal.
Figures 16, 17:
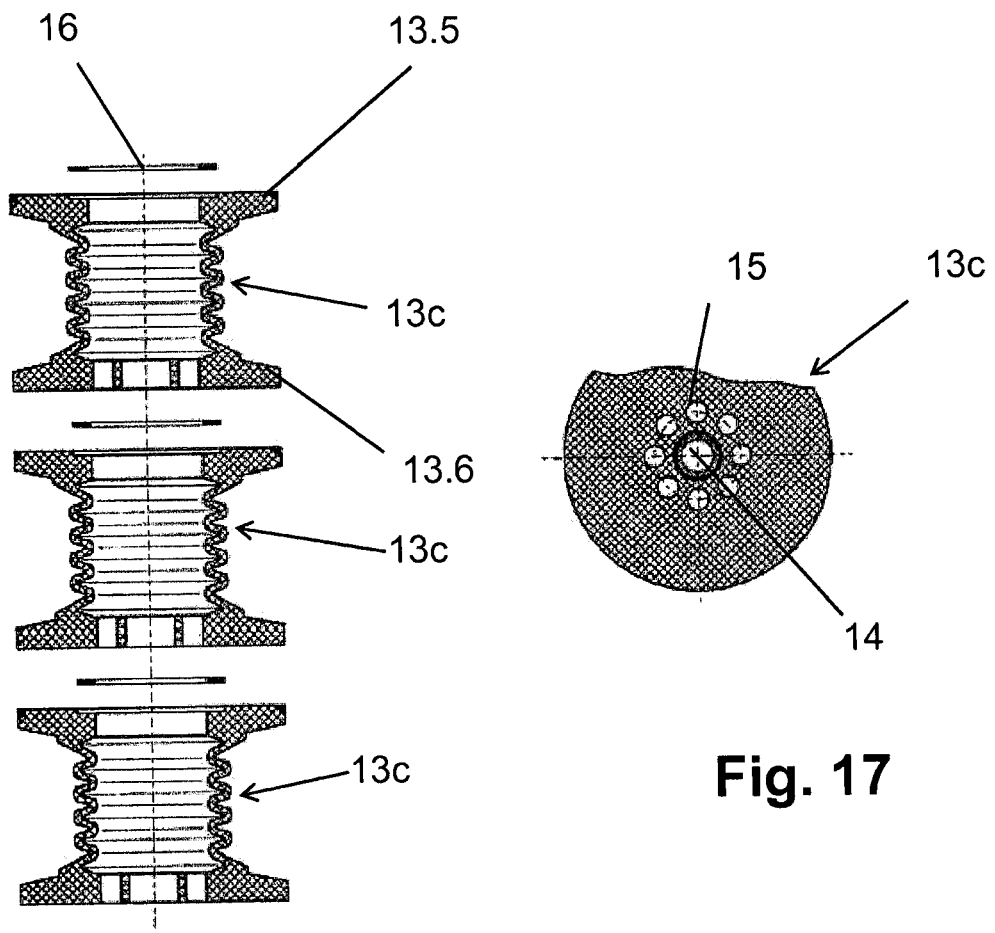
Figure 18:
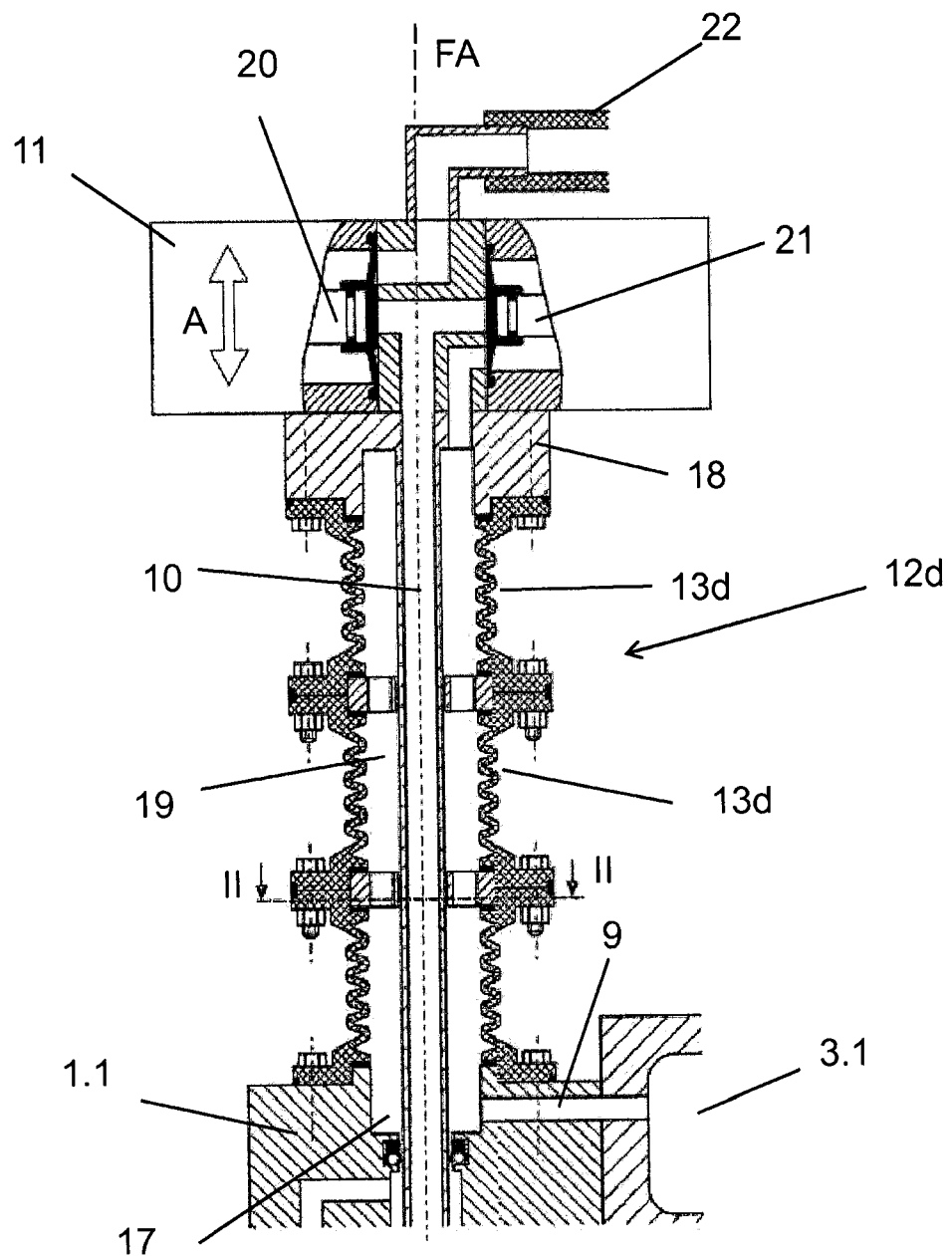
FIGS. 18-20 show views similar to FIGS. 2-4 of a further embodiment of the gaiter seal.
Figures 19, 20:
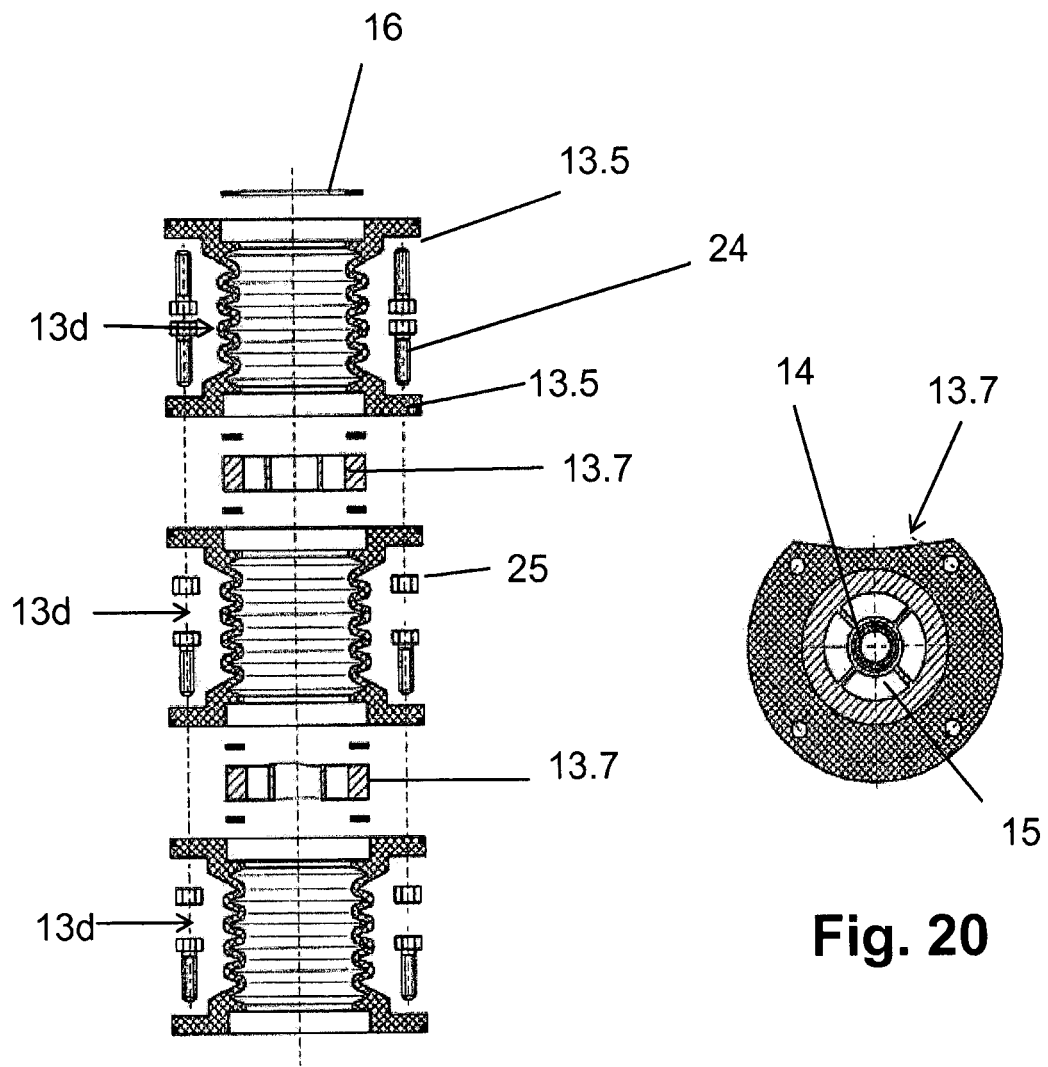

FIGS. 12-14 show a second alternative gaiter seal 12b that comprises a plurality of tightly interconnected individual gaiter modules 13b that succeed one another axially, i.e. along the filling element axis FA. These gaiter modules 13b only differ from the individual gaiter modules 13 by having first and second annular coupling sections 13.5, 13.6 arranged coaxially with the longitudinal axis of gaiter seal 12b and between which a gaiter section 13.3 is again formed. In this embodiment, the second coupling section 13.6 is configured like a disk having a central opening 14 and peripheral openings 15. The second coupling section thus as a sliding-and-supporting element of the gaiter seal 12b for support on the functional element 10.

The first and second annular coupling sections 13.5, 13.6 each have a radially projecting flange. Axially adjacent individual gaiter modules 13b that form gaiter seal 12b are connected to one another by fastening crews 24 and nuts 25 braced on these radially-projecting flanges. Sealing rings 16 seal off the interface between two axially adjacent gaiter modules 13b. Screws 24 attach the upper end of the gaiter seal 12b to a connector 18 and the lower end of the gaiter seal 12b to a filling element housing 1.1 by fastening. Sealing rings 16 seals off the interfaces thus formed.

In a view similar to that shown in FIGS. 204, FIGS. 15-17 show as a further embodiment in which axially adjacent modules 13c form a gaiter seal 2c. The gaiter modules 13c are executed in the same way as the gaiter modules 13b, although the coupling sections 13.5, 13.6 have no openings for screws 24. Instead, with this embodiment of a gaiter seal 12c, straps 26 interconnect the individual gaiter modules 13c. Each strap 26 has a C-section that is open toward the filling element axis FA and has sides that engage behind the radially-projecting flanges configured on the coupling sections 13.1, 13.2 on faces of a tapered ring. The upper and the lower ends of the gaiter seal 12c are also held on the connector 18 or on the top of the filling element housing 1.1 in the same way. For this purpose, the connector 18 and the filling element housing 1.1 are each configured with an annular flange 27 that concentrically surrounds filling element axis FA. The strap 26 engages behind this annular flange 27.

In a view similar to that shown in FIGS. 2-4, FIGS. 18-20 show a further embodiment in which a gaiter seal 12d also comprises multiple axially adjacent and tightly interconnected individual gaiter modules 13d. These differ in essence from the individual gaiter modules 13b in that each individual gaiter module 13d comprises coupling sections 13.5 at both ends. Between two individual gaiter modules 13d, which are axially connected to one another by screws 24 and nuts 25, is provided a disk-shaped intermediate piece 13.7 that is set into axially adjacent individual gaiter modules 13d and that forms a sliding-and-supporting element of the gaiter seal 12d. The gaiter seal 12d attaches to the connector 18 and to the top of the filling element housing 1.1 by screw-fastening as described in relation to the gaiter seal 12b.

Gaiter seals 12a-12d can be used in the same way as gaiter seal 12, especially with the filling elements 1, 1a-1c.

The invention has been described hereinbefore by reference to different embodiments. It goes without saying that the invention is not limited to these embodiment examples.

The gaiter seal is generally also suitable for other machines or their treatment heads, especially in the beverage industry where to ensure a process that is as sterile as possible it is important to shield an axially movable or adjustable rod-shaped or tubular functional element from outside influences or external contamination.

In particular, unlike the described embodiments, the rod-shaped or tubular functional element that is surrounded by the gaiter seal can be a stretching mandrel of a working head or of a mold of a stretch blow-molding machine for producing containers from plastic (PET) or a stretching/filling mandrel of a working head of a machine that uses a liquid medium, such as the filling product itself, to stretch a preform into a container.

In some embodiments, the sliding-and-supporting elements of the gaiter seal are configured for supporting on at least one outer guide, even though the described supporting on the rod-shaped and/or tubular functional element constitutes the more optimal solution.

The invention claimed is:

1. An apparatus comprising a gaiter seal (12) that extends along an axis, said gaiter seal (12) comprising a plurality of gaiter modules (13), each of which is a unitary structure, wherein said plurality of gaiter modules comprises first and second gaiter modules that are adjacent to each other, wherein each of said first and second gaiter modules comprises:
a first coupling section (13.1),
a second coupling section (13.2), which forms a support-and-sliding element that radially supports said first and second gaiter modules and guides said first and second gaiter modules during movement thereof along said axis, said first and second coupling sections being annular coupling sections, and
a gaiter section (13.3) that extends between said first and second coupling sections, wherein coupling sections of adjacent gaiter modules, including said first and second gaiter modules, are interconnected with one another along said axis,
wherein said first and second coupling-sections of said first gaiter module are structurally different from each other, wherein said first and second coupling-sections of said second gaiter module are structurally different from each other, wherein said first coupling-section of said first gaiter module is structurally identical to said first coupling section of said second gaiter module, wherein said second coupling section of said first gaiter module is structurally identical to said second coupling section of said second gaiter module, wherein said first coupling section of said first gaiter module is shaped so as to penetrate and mate with said second coupling section of said second gaiter module, wherein, as a result of said second coupling section of said second gaiter module having been penetrated by said first coupling section of said first gaiter module, said first coupling section of said first gaiter module and said second coupling section of said second gaiter module become interconnected and said first and second gaiter modules adjoin each other and are adjacent to each other, wherein said first coupling section of said first gaiter module is rigid, wherein said second coupling section of said first gaiter module is rigid, wherein said first coupling section of said second gaiter module is rigid, and wherein said second coupling section of said second gaiter module is rigid.

2. The apparatus of claim 1, further comprising a filling machine comprising a working head that comprises a first part, a rod-shaped electrical probe that is moved vertically by said first part so as to be extended into said container by said first part by an amount that controls a height of a product level in said container during filling of said container, and a second part, said gaiter seal extending between said first and second parts of said working head and surrounding said rod-shaped electrical probe.

3. The apparatus of claim 2, further comprising a screw-fastener that connects a gaiter module from said plurality of gaiter modules to said working head.

4. The apparatus of claim 1, further comprising a container processing machine configured to expand preforms into containers by filling said preforms with filling product, said container-processing machine comprising a working head that comprises a first part, a stretching mandrel that is moved vertically by said first part so as to be extended into said preform by said first part, and a second part, said gaiter seal extending between said first and second parts of said working head and surrounding said stretching mandrel.

5. The apparatus of claim 1, further comprising a container-processing machine comprising a working head that comprises a first part, a second part, and a functional element that is moved vertically by said first part, and a process path, wherein said gaiter seal defines an annular space between a wall thereof and said functional element, said annular space being permanently open to said process path.

6. The apparatus of claim 1, further comprising a container-processing machine comprising a working head that comprises a vertically-movable first part, a second part, and a functional element that is connected to said first part, a process path, and a valve, wherein said gaiter seal defines an annular space between a wall thereof and said functional element, and wherein said valve transitions between connecting said annular space to said process path and disconnecting said annular space from said process path.

7. The apparatus of claim 1, further comprising a container-processing machine comprising cleaning medium and a working head that comprises a first part, a second part, and a functional element that is moved vertically by said first part, wherein said gaiter seal defines an annular space between a wall thereof and said functional element, said annular space being connected to said cleaning medium.

8. The apparatus of claim 1, further comprising a coupling section that provides a connection between said first and second gaiter-modules, said coupling section having a central opening and peripheral openings disposed around said central opening.

9. The apparatus of claim 1, further comprising a coupling section between said first and second gaiter-modules, said coupling section comprising a central opening and peripheral openings disposed around said central opening, wherein each of said peripheral openings defines a passage that is angled relative to said axis.

10. The apparatus of claim 1, wherein wherein said gaiter seal further comprises a ring-shaped seal that is disposed to seal a joint between said first coupling section of said first gaiter module and said second coupling section of said second gaiter module.

11. The apparatus of claim 1, further comprising a strap that connects said first and second gaiter-modules to each other, said strap comprising a C-section that is open towards said axis, wherein coupling modules of said first and second gaiter modules each comprise a radially-projecting flange, wherein said radially-projecting flange of said first gaiter module and said radially-projecting flange of said second gaiter module meet to form a tapered ring that has a first face and a second face that face away from each other, and wherein said C-section engages said tapered ring.

12. The apparatus of claim 1, said first gaiter module comprising a disk-shaped coupling section that comprises a flange that extends radially from said axis and said second gaiter module comprising a disk-shaped coupling section that comprises a flange that extends radially from said axis and that is screwed to said flange of said first gaiter module.

13. The apparatus of claim 1, wherein said first coupling section of said first gaiter module has a female thread and said second coupling section of said second gaiter module has a male thread.

14. The apparatus of claim 1, said first gaiter module comprising a disk-shaped coupling section that comprises a flange that extends radially from said axis and said second gaiter module comprising a disk-shaped coupling section that comprises a flange that extends radially from said axis and that is braced against said flange of said first gaiter module.

15. The apparatus of claim 1, further comprising an intermediate piece that comprises first and second male threads, wherein said first coupling section of said first gaiter module comprises a female thread that engages said first male thread of said intermediate piece and wherein said second coupling section of said second gaiter module comprises a female thread that engages said second male thread of said intermediate piece.

16. The apparatus of claim 1, further comprising a filling machine comprising a rotor that comprises a filling element disposed thereon, said filling element comprising a working head that comprises a first part, a tube that is moved vertically by said first part so as to be extended into said container by said first part by an amount that controls a height of a product level in said container during filling of said container, and a second part, said gaiter seal extending between said first and second parts of said working head and surrounding said tube.

17. The apparatus of claim 1, wherein said plurality of gaiter modules comprises first and second gaiter modules that are adjacent to each other and that touch each other.

18. The apparatus of claim 1, further comprising a filling element comprising a probe that passes through said gaiter seal and a working head having a first and second part, said first part causing said probe to move along said axis, wherein said gaiter seal extends between said first and second parts of said working head.

* * * * *